Dec. 13, 1960 W. L. HATTON 2,964,624

BROAD BAND LIMITERS

Filed Oct. 11, 1952 2 Sheets-Sheet 1

INVENTOR
WILLIAM L. HATTON
BY Elmer J. Gorn
ATTORNEY

INVENTOR
WILLIAM L. HATTON
BY Elmer J. Gorn
ATTORNEY

United States Patent Office 2,964,624

Patented Dec. 13, 1960

2,964,624

BROAD BAND LIMITERS

William L. Hatton, Newtonville, Mass., assignor to Raytheon Company, a corporation of Delaware Filed Oct. 11, 1952, Ser. No. 314,258

3 Claims. (Cl. 328—86)

This invention relates to limiters, and more particularly to those of the plate-saturation type adapted to pass efficiently a wide band of frequencies.

In frequency modulation receivers it is important to eliminate, as much as possible, any amplitude modulation on the incoming signal before it enters the demodulator. In one such circuit, a grid leak is added in the input and the plate is operated at a low voltage. In such a circuit, the control grid and cathode of the limiter tube act as a diode rectifier when the grid is driven positive and a charge is stored on the grid condenser. This charge follows the amplitude of signal and tends to bias the tube negatively to prevent the signal driving the grid more than slightly positive. This grid leak circuit introduces an additional time constant into the limiter.

In conventional limiters, the band width is determined in part by the time constants of the circuit, particularly that of the input part of the circuit. It has been found that, by making use of the characteristics of certain types of tubes, for example the 6AS6, excellent limiting action can be obtained. This type of tube, when operated with low plate voltage in the order of ten volts, gives limiting action without the necessity of adding a network having an appreciable time constant, such as the grid leak of the circuit mentioned above. A circuit using such tubes is not as restricted as to band width as other limiter circuits. A family of plate-current plate-voltage characteristic curves for such a tube, one curve for each of several grid biases, will show a tendency for the curves for the various grid biases to coincide in the region of very low plate voltage. In this region of coincidence of the characteristic curves, an increase in grid potential above a predetermined value will produce no change in plate current. Such a tube operated with such a low plate voltage will saturate with a voltage on the grid a little above the cutoff voltage of the tube and a wide swing of grid voltage may be applied without the grid going positive. In such a limiter, there is no need for a grid leak in the input circuit in order to obtain the limiting action. In the absence of such a grid leak, with its added time constant, the pass band of the circuit can be made considerably wider than it would be with a grid leak in the input. Furthermore, the input tuned circuit, if one is used, sees a constant load with the result that the band pass does not vary with the amplitude of the signal.

Other and further objects and advantages will be apparent as the description thereof progresses, reference being had to the drawing in which.

Figure 1:
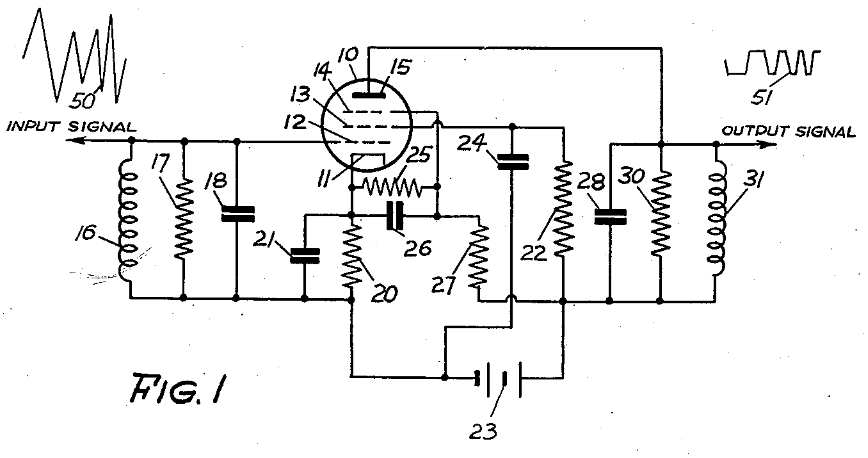
Fig. 1 is a schematic diagram of a circuit embodying the invention.

In Fig. 1, the reference numeral 10 indicates a pentode, such as the type 6AS6 referred to above, having a cathode 11, a control grid 12, a screen grid 13, a suppressor grid 14, and a plate 15. The control grid 12 is connected to the cathode 11 through an input circuit here shown as a tuned circuit comprising an inductance 16, a resistor 17, and a capacitor 18 connected in parallel, and a self-biasing circuit comprising a resistor 20 and capacitor 21, connected in parallel. The screen grid 13 is maintained at a positive potential by being connected to the cathode 11 through a resistor 22, a source 23 of positive potential and the resistor 20. Any R.F. voltage appearing on its is by-passed to the cathode through a capacitor 24. The suppressor grid 14 is connected to the cathode 11 through a resistor 25 and a capacitor 26 connected in parallel. It is shown in Fig. 1 as maintained at a positive potential by being connected to the source 23 of positive potential through a resistor 27. The plate 15 is maintained at a positive potential by being connected to the source 23 of positive potential through an output circuit shown as a tuned circuit comprising a capacitor 28, a resistor 30, and an inductance 31 connected in parallel.

Figure 2:
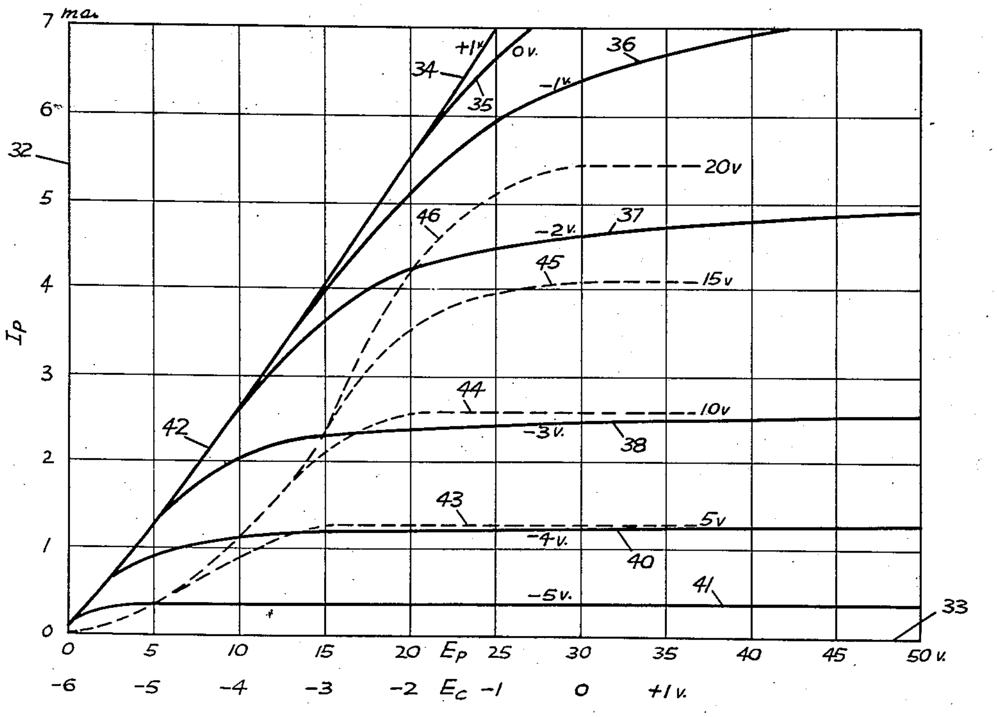
Fig. 2 is a family of plate-current plate-voltage and plate-current grid voltage characteristic curves for a representative type of tube used in the circuit of Fig. 1.

The operation of this limiter circuit will be best understood with reference to the curve shown in Fig. 2. One set of these curves represents the variation of plate current $I_p$ shown along the co-ordinate 32 with the plate voltage $E_p$ shown along the abscissa. A second set represents the variation of plate current with grid voltage $E_c$ also shown along the abscissa 33. A family of curves are shown for a representative type of tube, a 6AS6, whose characteristics were found to fit it for operation as a broad band limiter in the circuit of Fig. 1. The curve 34 is for a grid bias of one volt positive, the curve 35 is for zero grid bias, the curves 36, 37, 38, 40, and 41 are for grid biases of 1, 2, 3, 4, and 5 volts negative, respectively. It will be seen that, as the plate voltage is reduced, the curves for different grid voltages tend to coincide along a straight line 42. Operation in this region of coincidence produces saturation, as is best understood by reference to the curves shown in dotted lines in Fig. 2. Curve 43 represents the variation of plate current with grid voltage when five volts are applied to the plate. Curve 44 is a similar curve for a plate voltage of ten voltage, curve 45 is one for fifteen volts, and curve 46 is one for twenty volts. It will be seen that curve 43 becomes virtually a straight line parallel to the abscissa at negative grid potential of less than three volts; that is, the plate current does not increase appreciably as the grid voltage moves further in the positive direction. With higher plate voltages, the tube saturates at less negative grid potentials until at twenty volts on the plate the grid must be positive for saturation. The result is that a signal, such as the wave form 50 in Fig. 1, appearing at the input with both frequency and amplitude modulation will appear at the output with only frequency modulation, as shown by the wave form 51 in Fig. 1.

Figure 3:
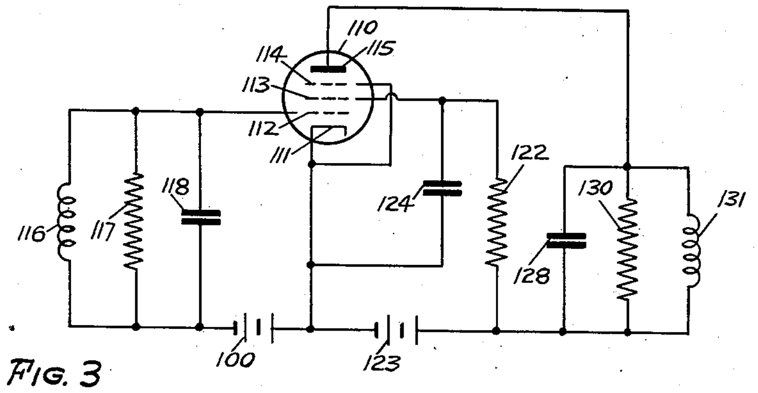
Fig. 3 is a schematic diagram of a modified circuit embodying the invention.

These characteristic curves were taken with the suppressor grid at cathode potential and the screen grid at 120 volts. Fig. 3 shows such a modification of the circuit shown in Fig. 1. The suppressor grid 114 is connected directly to the cathode 111 and a source 100 of negative potential is connected between the grid 112 and cathode 111, through the input tuned circuit comprising inductance 116, resistor 117, and capacitor 118. The rest of the circuit is the same as in Fig. 1 with the components having reference numbers that are the original numbers plus 100.

Figure 4:
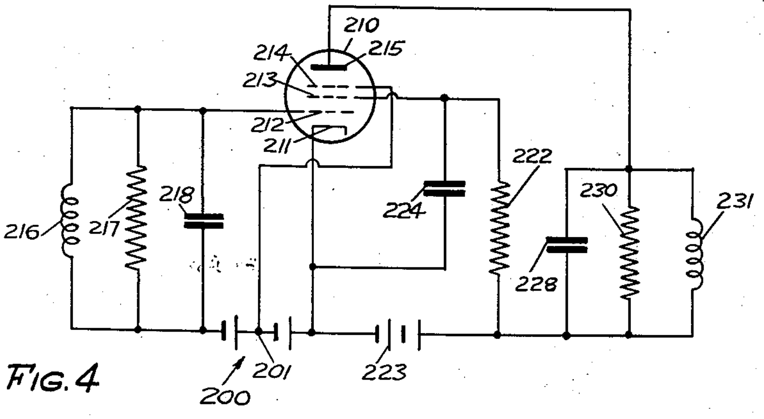
Fig. 4 is a schematic diagram of another modified circuit embodying the invention.

The limiting effect can be improved if the suppressor grid is made somewhat negative with respect to the cathode. Fig. 4 shows such a modification. The suppressor grid 214 is connected to the cathode through a portion of the source 200 that supplies the grid bias through a tap 201. The rest of the circuit is the same as in Fig. 1 with the components having reference numbers that are the original numbers plus 200. With this circuit the gain of the stage is reduced below unity and additional amplification may be needed.

When the suppressor grid is operated at a positive potential with respect to the cathode as shown in Fig. 1, the gain is increased but the grid lines tend to cross over instead of converging which reduces the limiting effect of the circuit. This circuit is usually preferable as it is desirable to have some gain even at the expense of the limiting action.

Under certain conditions, it is desirable to have the grid bias vary with the amplitude of the signal. The bias resistor 20 in the cathode circuit of Fig. 1 is introduced for this purpose. The resistor 20 and its by-passing capacitor 21 introduce a time constant limiting the pass band. However, this time constant can be kept very small while retaining the biasing effect for the radio frequency energy, and thus will not seriously limit the pass band of the circuit. The capacitor 26, which serves to by-pass the resistor 25 in the return circuit from the suppressor grid 14 to the cathode 11, in the version of the circuit of the invention shown in Fig. 1 utilizing a positive suppressor grid, is intended to keep the suppressor to cathode voltage as constant as possible. Thus the principal limitations on the band pass of the limiter circuit of this invention are the parameters of the input circuit, such as the tuned circuit comprising inductor 16, resistor 17, and capacitor 18, and the output circuit, such as the tuned circuit comprising capacitor 20, resistor 30, and inductor 31. Efficient limiting action can be obtained over a wide band of radio frequencies.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An amplitude limiter circuit for electrical signals, comprising an electron discharge device having an anode, a cathode, and first, second and third grid electrodes, means for applying a substantially normal rated positive voltage to said second grid electrode with respect to said cathode, means for applying a voltage to said anode which is a small fraction of the positive voltage normally rated for application thereto with respect to said cathode, said discharge device being characterized by substantially asymptotic coincidence of the plate current versus plate voltage characteristic curves over a range of input voltages applied between said first grid electrode and said cathode under the conditions of operation defined by the said voltages respectively applied to said second grid electrode and said anode with respect to said cathode, means for conductively connecting said third grid electrode to said cathode, an input circuit connected between said first grid electrode and said cathode, and an output circuit connected between said anode and said cathode.

2. An amplitude limiter circuit for electrical signals, comprising an electron discharge device having an anode, a cathode, and first, second and third grid electrodes, means for applying a substantially normal rated positive voltage to said second grid electrode with respect to said cathode, means for applying a voltage to said anode which is a small fraction of the positive voltage normally rated for application thereto with respect to said cathode, said discharge device being characterized by substantially asymptotic coincidence of the plate current versus plate voltage characteristic curves over a range of input voltages applied between said first grid electrode and said cathode under the conditions of operation defined by the said voltages respectively applied to said second grid electrode and said anode with respect to said cathode, means for applying a small positive voltage to said third grid electrode with respect to said cathode, an input circuit connected between said first grid electrode and said cathode, and an output circuit connected between said anode and said cathode.

3. An amplitude limiter circuit for electrical signals, comprising an electron discharge device having an anode, a cathode, and first, second and third grid electrodes, means for applying a substantially normal rated positive voltage to said second grid electrode with respect to said cathode, means for applying a voltage to said anode which is a small fraction of the positive voltage normally rated for application thereto with respect to said cathode, said discharge device being characterized by substantially asymptotic coincidence of the plate current versus plate voltage characteristic curves over a range of input voltages applied between said first grid electrode and said cathode under the conditions of operation defined by the said voltages respectively applied to said second grid electrode and said anode with respect to said cathode, means for applying a small negative voltage to said third grid electrode with respect to said cathode, an input circuit connected between said first grid electrode and said cathode, and an output circuit connected between said anode and said cathode.

References Cited in the file of this patent

UNITED STATES PATENTS

| | | |
|---|---|---|
| 2,095,261 | McCaa | Oct. 12, 1937 |
| 2,106,172 | Haffcke | Jan. 25, 1938 |
| 2,204,090 | Landon | June 11, 1940 |
| 2,266,541 | Foster et al. | Dec. 16, 1941 |
| 2,295,323 | Armstrong | Sept. 8, 1942 |
| 2,340,429 | Rankin | Feb. 1, 1944 |
| 2,353,018 | Duke | July 4, 1944 |
| 2,519,057 | Luck | Aug. 15, 1950 |
| 2,761,920 | Steen | Sept. 4, 1956 |

OTHER REFERENCES

Batcher et al.: The Electronic Engineering Handbook, published by Electronics Development Associates, New York, 1944, page 30.

"Ultra-High Frequency Techniques," by Brainard et al., July 1944, paragraph 8–5, pages 282–283.

Kiver: F-M Simplified, published by Van Nostrom, New York, 1947, pages 102 to 106.

Marchand: Frequency Modulation, published by the Murray Hill Book Company, New York, 1948, pages 209 to 214.

RCA Receiving Tube Manual, published by Tube Division, RCA, Harrison, New Jersey, 1954.